UNITED STATES PATENT OFFICE.

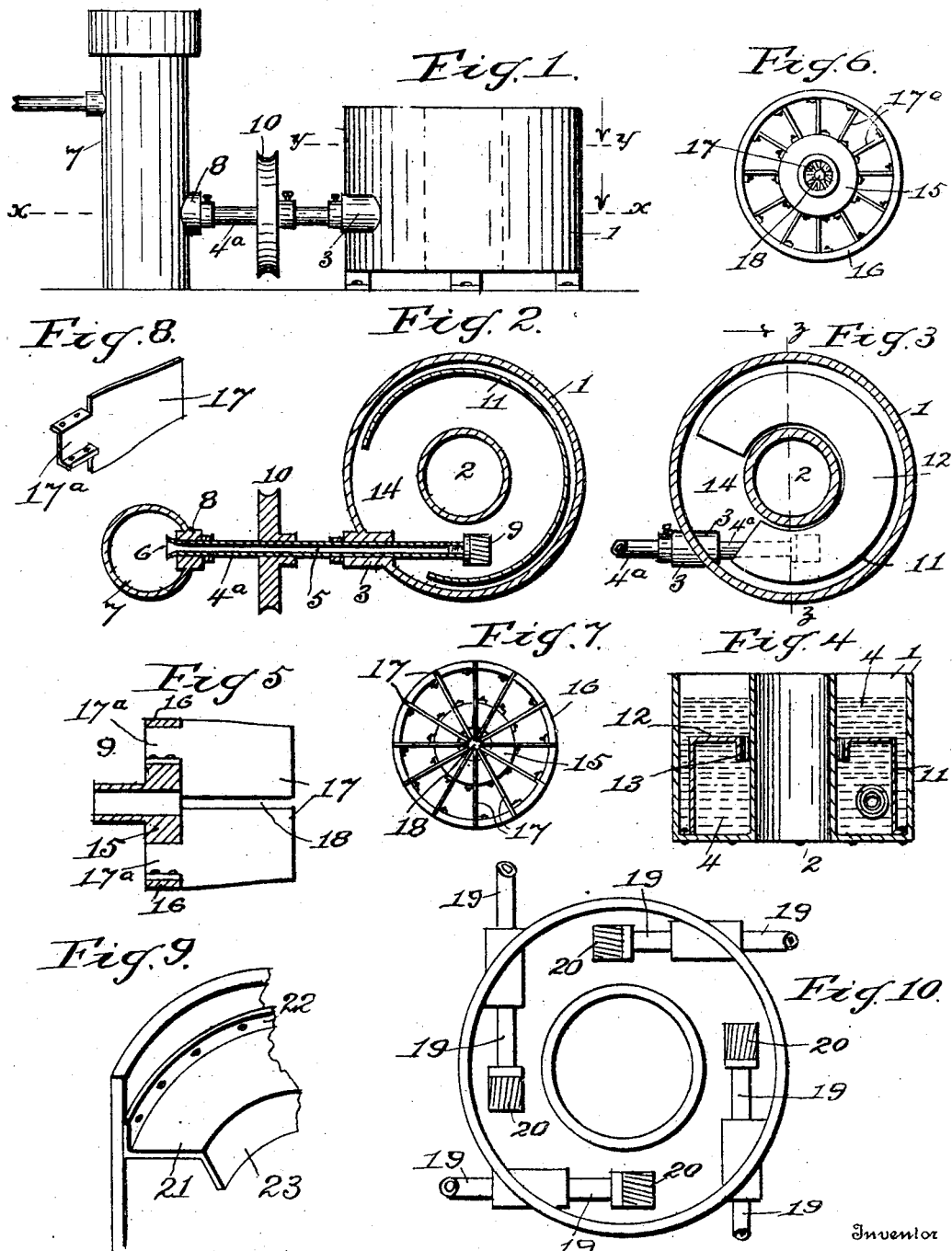

SELDEN IRWIN CLAWSON, OF SALT LAKE CITY, UTAH.

FUME-ARRESTER.

No. 796,956.  Specification of Letters Patent.  Patented Aug. 8, 1905.

Application filed May 31, 1904. Serial No. 210,450.

*To all whom it may concern:*

Be it known that I, SELDEN IRWIN CLAWSON, a citizen of the United States, residing at Salt Lake City, in the county of Salt Lake and State of Utah, have invented certain new and useful Improvements in Fume-Arresters, of which the following is a specification.

This invention relates to the class of fume-arresters employing a body of water into which the fumes are conveyed, and pertains especially to an improved apparatus for arresting fumes formed in volatilization processes and for arresting fumes generated by roasting ores, condensing the fumes and more thoroughly recovering such metal values as the fumes contain.

The object of the invention is to provide an improved apparatus of novel and peculiar construction and arrangement for arresting volatilization fumes, discharging the latter through and by a wheel into a body of water agitated under the action of the wheel during its discharge, so as to extract the metal values of the fumes.

A further object of the invention is to provide a fume arrester and condenser having a revoluble hollow shaft to carry the fumes from the fume-pipe into a body of water during the revolution of the shaft and to provide the discharge end of the said shaft with a novel and peculiar wheel, which by its centrifugal force forms a vacuum into which the fumes are sucked and distributed through a body of water agitated by the said wheel to condense the fumes and to precipitate the metal values thereof.

A still further object of the invention is to provide a peculiar baffle-plate extending partly around the interior of a vessel or tank containing a body of water and to provide a peculiar wheel to suck the fumes thereinto and to revolubly discharge them under the baffle plate or ring for the purpose of confining the fumes in their circular movement, whereby the metal values of the fumes may be more thoroughly recovered.

Other objects, advantages, and improved results of which the apparatus is capable will be developed in the practical application of the invention.

In the accompanying drawings, forming part of this application, Figure 1 is an elevation of the apparatus. Fig. 2 is a sectional view on the line $x\ x$, Fig. 1. Fig. 3 is a sectional view on the line $y\ y$, Fig. 1. Fig. 4 is a sectional view on the line $z\ z$, Fig. 3. Fig. 5 is a detail sectional view of the paddle-wheel. Fig. 6 is a front end view of the wheel. Fig. 7 is a rear end view of the wheel. Fig. 8 is a perspective view of one of the wheel-blades. Fig. 9 is a modified form of baffle-plate, partly broken away. Fig. 10 is a top view of a modification, showing a series of revoluble hollow shafts, each having a propeller or paddle wheel.

The invention, broadly considered, comprises a revoluble hollow shaft one end of which is located in the fume box or pipe and the other end projects into a body of water contained in an open vessel, combined with a wheel carried by the shaft for agitating the water, and through which wheel the fumes are drawn from the shaft and discharged into the water.

The same numeral-references denote the same parts throughout the several views of the drawings.

The water tank or vessel 1 is preferably one of ring or cylindrical shape having a central opening 2 therethrough and an open top. The vessel is provided with a suitable water-tight bearing 3 and is occupied by a body of water 4, and it may be provided with proper means for supplying and removing the water, as well as with suitable means for removing the precipitated metal values therefrom. The said vessel may be vertically or longitudinally disposed, as desired or as occasion may demand; but for purposes of illustration and preference the tank or vessel is here employed in vertical position.

The shaft $4^a$ is made hollow, so as to form a fume passage or channel 5, and one end of the shaft, which may have a flaring or funnel-shaped mouth 6, is located in the fume box or pipe 7, which has a steam-tight shaft-bearing 8. The shaft extends through the bearing 3, and its other end is provided with a propeller or vane wheel 9. While the shaft is shown with a driving-pulley 10, it may be driven by pinion and gear or other suitable mechanism suitably adapted for the purpose.

In order to more closely confine the fumes and provide a contracted channel through which they are driven from and by the wheel 9, as well as prevented from shooting up through the water before the metal values are wholly precipitated, a baffle-ring 11 is secured in the vessel and has a top plate 12, provided with a depending flange 13. A portion of the ring is removed to form an opening 14, through which the fumes pass and are permitted to spread throughout the body of water. This trough or channel, while closed on its top and outer circumference, has its ends open, and from the flange 13 to the bottom of the vessel the trough is open.

The propeller or agitating wheel 9 has a hollow hub 15 to fit and be secured to the shaft $4^a$ and is provided with a rim or flange 16, a series of paddles, vanes, or blades 17, having a neck $17^a$, secured within the rim 16 at an angle of about forty-five degrees and are bent or otherwise positioned so as to extend or project from the said rim in spiral shape and to leave a central duct 18 longitudinally through the wheel from one end to the other of the paddles. This wheel not only disturbs or agitates the water, but creates a vacuum into which it sucks the fumes, whence the latter are whirled and beaten into the body of water, so that all particles of metal are precipitated to the bottom of the vessel, the length of the paddles being preferably about equal to the diameter of the rim.

Referring to the modification shown in Fig. 10, a series of hollow shafts 19 are employed, each having a suction-wheel 20, and any one or more of the shafts may carry fumes into the water, while the remainder of the shafts introduce air, and the wheels of the latter shafts agitate the water.

Referring to the modification shown in Fig. 9, the baffle-plate 21 has a rim 22, by means of which it is removably secured within the water vessel and is provided with a depending flange 23, which is inclined outwardly from the plate 21.

Having thus described my invention, what I claim as new, and desire to secure by Letters Patent, is—

1. In a fume-arrester, the combination, with a suitable tank or vessel containing a body of water, of a suction-wheel revoluble in the water, and means upon which the wheel is mounted adapted to carry the fumes to the wheel for distribution centrally through and in line with the intake of said wheel.

2. In a fume-arrester, the combination, with a ring-shaped vessel containing a body of water, of a wheel immersed in the water and adapted to be revolved at right angles to the vessel and having projecting vanes and adapted to receive the fumes at one end and discharge them at the other end of the vanes during the revolution of the wheel, an imperforate hollow shaft extending partly into the vessel and upon which shaft the wheel is mounted, and means to revolve the shaft.

3. The combination, with a fume-pipe, and a water tank or vessel, of a hollow imperforate shaft terminating in the fume-pipe and in the side of the said tank, a wheel on the tank end of the shaft to revolve the water perpendicular to the axis of the tank and to receive at one side the fumes from the shaft and to discharge them centrally at the opposite side, and means to drive the shaft.

4. In a fume-arrester, the combination, with a ring-shaped vessel containing a body of water and having a shaft-bearing in the side thereof, of the shaft working in said bearing and having an imperforate fume-channel, a wheel mounted on said shaft and immersed in the water and having projecting vanes through which the fumes are drawn into a vacuum made by the revolution of the wheel.

5. In a fume-arrester, the combination, with a ring-shaped vessel containing a body of water, of an imperforate fume-shaft, and a wheel on the shaft adapted to propel the water in a circular direction perpendicular to the revolution of the wheel, and to discharge the fumes in line with its axis.

6. In a fume-arrester, the combination, with a vessel containing a body of liquid, a propeller-wheel, an imperforate baffle-plate extending partly around the interior of the vessel to form a circular watercourse in front of the wheel, said wheel being under one end of the baffle-plate and adapted to force the fumes out at the other end of said plate.

7. In a fume-arrester, the combination, with the cylindrical vessel, of a circular baffle-plate within the vessel and having a portion thereof removed, and a flange depending from the baffle-plate so as to form an open-end trough under the top of the said plate for the circulation of the fumes.

8. The combination, with a vessel containing a body of water and having a central opening therethrough and an open top, of means to give the water a circular motion and to inject volatilization fumes thereinto during such motion, comprising a hollow imperforate shaft reaching into the vessel without extending through it, and a suction-wheel carried by the shaft and having paddles or vanes which taper from the wheel-hub to their ends.

9. In an apparatus for arresting fumes in volatilization processes and for recovering the metal values of the fumes, the combination, with a ring-shaped vessel containing a body of water, and an imperforate baffle-plate extending partly around the inner circumference of the vessel, of a suction-wheel under one end of the baffle-plate to receive the fumes at one end and discharge them at the other end, an imperforate hollow shaft to carry the fumes to the wheel and upon which the latter is mounted, and means to revolve the shaft so as to force the fumes in circular motion through the water from one end to the other of the baffle-plate.

In witness whereof I hereunto set my hand in the presence of two witnesses.

SELDEN IRWIN CLAWSON.

Witnesses:
SPENCER CLAWSON,
H. G. WHITNEY.